Figure 1:
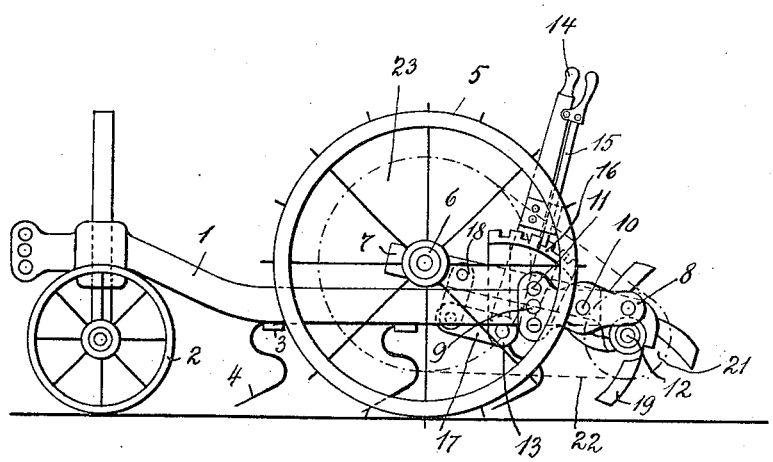

Nov. 6, 1923.

D. C. PEDERSEN 1,472,813

CULTIVATOR

Filed Nov. 25, 1921  2 Sheets-Sheet 1

INVENTOR:
Dines Christian Pedersen
By Wm Wallace White
ATTY.

Nov. 6, 1923.  
D. C. PEDERSEN  
CULTIVATOR  
Filed Nov. 25, 1921  
1,472,813  
2 Sheets-Sheet 2

INVENTOR:  
Dines Christian Pedersen  
BY Wm Wallace White  
ATTY.

Patented Nov. 6, 1923.

1,472,813

UNITED STATES PATENT OFFICE.

DINES CHRISTIAN PEDERSEN, OF HOLBAK, DENMARK.

CULTIVATOR.

Application filed November 25, 1921. Serial No. 517,478.

*To all whom it may concern:*

Be it known that I, DINES CHRISTIAN PEDERSEN, a subject of the King of Denmark, residing at Holbak, in the Kingdom of Denmark, have invented new and useful Improvements in Cultivators, of which the following is a specification.

Earth tilling implements for instance plows with a rotary disintegrating device coupled behind are already known. Such implements are used for working and preparing the soil, so that after the treatment it will at once be ready for sowing, and ordinarily they are only used when new land is to be cultivated. In ordinary agriculture, as it is well known, the soil is first plowed and then, after the lapse of a shorter or longer period, the final treatment with cultivator, harrow or similar implements is performed immediately before sowing.

The invention has now for its object to provide a cultivator with a rotary disintegrating device.

The invention is illustrated on the drawing, where—

Figure 2:
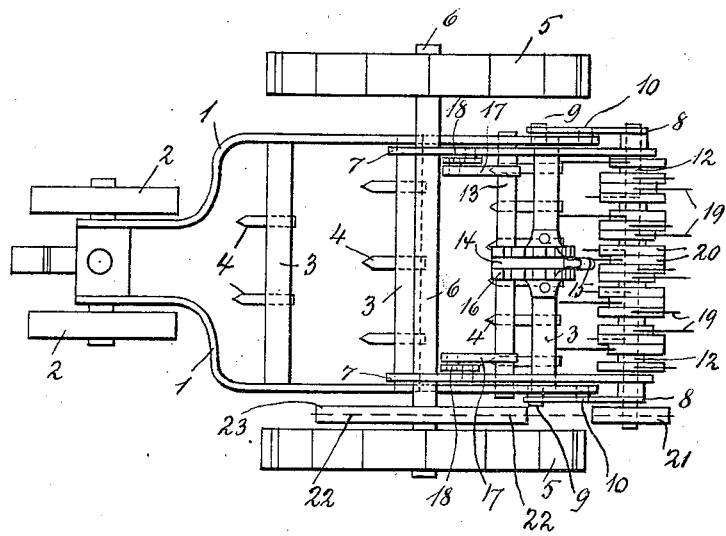
Figure 3:
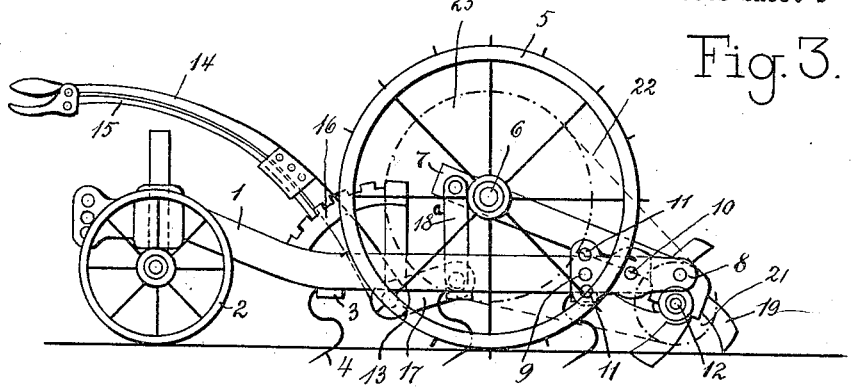
Figure 4:
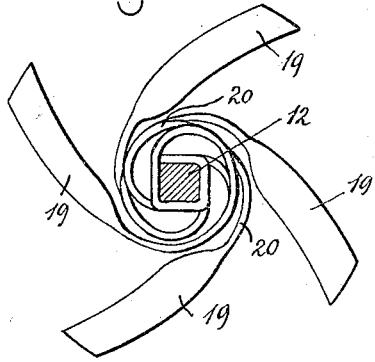
Figure 5:
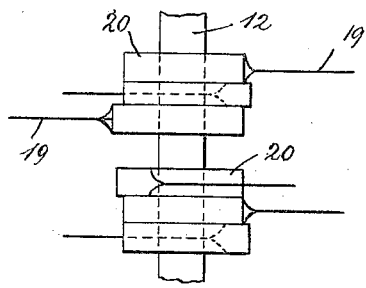
Figure 6:
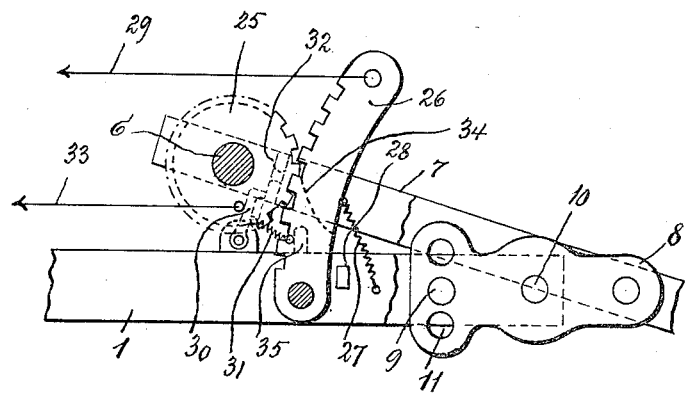

Fig. 1 shows a cultivator with the disintegrating device attached thereto, viewed from the side with the disintegrator in raised position, Fig. 2 the same in top view, Fig. 3 the cultivator with the disintegrating device in working position, viewed from the side, Fig. 4 and Fig. 5 some details of the cultivating device and Fig. 6 a portion of the frames of the cultivator and the disintegrating device with a lifting arrangement differing in construction from the one shown in Figs. 1 to 3.

The frame 1 of the cultivator is fitted at front with two steering and supporting wheels 2 and several cross-beams 3 to which the cultivator teeth 4 are fastened in ordinary manner. In the construction shown there are provided three rows of teeth, viz. two in the foremost, three in the central and six in the rearmost row, the said teeth being staggered in such a manner that there will be equal spaces between their vertical planes.

The axle 6 of the running wheels 5 is journalled in a special frame 7, which is hinged to the rear ends of extensions 8 of the side members of the frame 1. These extensions 8 are fastened each to one of the side members of the frame by means of two bolts 9 and 10, Figs. 1 and 3. For the front bolts 9 there are provided in each extension three holes 11 disposed on top of each other. The extensions may hereby be adjusted in three different positions, each of the said extensions being adapted to turn about one of the bolts 10, while the corresponding bolts 9 may either be passed through the topmost, the central or the bottommost hole 11 in the extensions and through a hole in the corresponding side member of the frame. Hereby the rear ends of the extensions may be adjusted so as to come either above or below the rear end of the frame 1. The rear ends of the frame 7 are bent downward, and are fitted with bearings for the shaft 12 of the disintegrating device, the ends of the said shaft being of circular cross-section, while its intermediate portion is of polygonal, for instance square, cross-section.

In Figs. 1 to 3, a shaft 13 is journalled in bearings on the side members of the frame 1, to which shaft there is attached a lever 14 with a coupling rod 15 adapted to engage a toothed sector 16 fastened on the frame 1 of the apparatus. In firm connection with the lever 14, or with the shaft 13, there is provided an arm 17, whose free end is connected to the frame 7 by means of a rod 18ª.

The lever 14, by being turned either forward or backward, respectively, after the coupling rod 15 has been released, serves to raise or lower the main frame. When the main frame 1 is to be lifted from the working position to the inoperative position, the lever 14 is turned forward, whereby the free end of the arm 17 is turned downward. By the pull exerted in the frame 7 close to the wheel axle 6 by means of the rod 18 the frame 1 and, thereby, the teeth 4 and the disintegrating apparatus will be lifted from the working position into the inoperative position, and the operating lever is then again coupled firmly to the toothed sector 16. When the frame 1 and the implements are to be lowered, the lever has to be uncoupled and turned towards the rear, and the frame will then sink down owing to its own weight and the weight of the implements, until the lever is again locked in position.

In Fig. 6 there is shown a modified construction of the lifting device. On the axle 6 there is provided, on either side, a gear wheel 25 following the rotation of the axle, and on each of the side members of the frame 1 there is provided a rotary toothed sector 26, which is normally out of mesh with the corresponding gear wheel 25, as it is held pressed against a stop 28 on the side member of the frame 1 by means of a spring 27. When the cultivator is pulled by a tractor, a cord 29 leads to the driver's seat on the tractor. The toothed sector 26 is caused to engage the gear wheel 25, when the driver exerts a pull in this rope, and the frame 1 will then be lifted as the rotating gear wheel will lift the toothed sector 26. In order to effect coupling of the frame 1 to the frame 7 there may for instance be provided on the frame 1 a hook 30, the point of which is held pressed against the edge of a clip 32 provided on the frame 7. When the frame 1 is lifted into the inoperative position, the hook 30 slides into the clip 32, whereby the two frames are held together, until the hook 30 is again pulled out from the clip by means of a cord 33 leading to the driver's seat. The hook 30 may also serve to lock the frame 1 in lowered position, and the clip 32 is then made double, so as to have also an opening adapted to be engaged by the hook, when the frame 1 is lowered. During the last portion of the lifting motion of the frame 1, the toothed sector 26 should be moved out of engagement with the gear wheel 25. This may be effected for instance by means of a curved or slanting stop 43 on the toothed sector 26 co-operating with another stop 35 on the frame 1 during the last portion of the lifting operation. By the co-operation between these two stops the toothed sector is turned rearward so far that it comes entirely out of engagement with the gear wheel 25, when the hook 30 has entered the clip 32.

The disintegrating device consists of a number of slightly curved blades suitably made each from a strip of spring-steel one end of which 19 is twisted at right angle to the other portion 20. The portion 19 forms the cutting blade, which may be wholly or partly detachable, while the portion 20 is bent in shape of a spiral spring the end of which forms the means of attachment to the shaft 12. When the latter, as in the construction shown, is of square cross-section, each blade is displaced 90° relatively to the adjoining one, so that the disintegrating devices will have four rows of blades. These are partly disposed close to one another, so that the distance between the planes of the blades will merely correspond to the width of the strips of spring-steel used, and partly rings are inserted between some of the blade hubs, so that the spaces between the corresponding cutting blades will be increased at the points where the cultivator teeth 4 in the rearmost row necessitate a larger distance between two blades.

The shaft 12 may suitably be journalled in bearings in the rear ends of the frame 7, the latter being fork-shaped and open at bottom, while the bearings are fastened by means of a pinching screw through each of the fork prongs. On the shaft there is provided a chain wheel 21 for a chain 22, which is also passed over a chain wheel 23 provided on the carriage axle 6 and rotating together with the same. The shaft 12, however, may also be driven by a set of gearwheels instead of by a chain drive. The disintegrating device is located in such a manner relatively to the cultivator that its blades will be operating immediately alongside of and between the teeth 4 in the rearmost row, so that the blade points will cut into the soil at the point where the cultivator teeth project above the ground.

Having now particularly described and ascertained the nature of my said invention and in what manner the same is to be performed, I declare that what I claim is:—

Earth tilling implement comprising a cultivator with teeth disposed in several rows on a frame, means for raising and lowering and for fixing the said frame in raised position, a disintegrating device consisting of a number of blades placed alongside of one another on a shaft, the said shaft being journalled in a frame which is hinged to extensions of the frame of the cultivator, the said extensions being adjustable up or down relatively to the cultivator frame, the frame of the disintegrating device being furthermore connected to the axle for the rear supporting wheels of the cultivator, means for rotation of the blade shaft by transmission from the said supporting-wheel axle, means for rotation of the said shaft and blades, means for raising and lowering as well as for fixing the disintegrating device in raised position.

In testimony whereof I have signed my name to this specification.

DINES CHRISTIAN PEDERSEN.

Witnesses:
V. BELSCHNER,
F. ENGELHARDT MADSEN.